(12) United States Patent
Chen et al.

(10) Patent No.: US 8,597,483 B2
(45) Date of Patent: Dec. 3, 2013

(54) METHOD FOR MAKING A WAVE-ABSORBING SHEET

(75) Inventors: Yen-Chung Chen, Taoyuan County (TW); Ker-Jer Huang, Taoyuan County (TW); Chien-Chih Kung, Taoyuan County (TW); Shang-Wanq Yeh, Taoyuan County (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 84 days.

(21) Appl. No.: 13/454,196

(22) Filed: Apr. 24, 2012

(65) Prior Publication Data

US 2013/0277224 A1  Oct. 24, 2013

(51) Int. Cl.
*C25D 13/02* (2006.01)
(52) U.S. Cl.
USPC .................................... 204/490; 204/491
(58) Field of Classification Search
USPC .................................. 204/490, 491
See application file for complete search history.

(56) References Cited

U.S. PATENT DOCUMENTS

2013/0063296 A1* 3/2013 Hennig et al. ............ 342/1

* cited by examiner

*Primary Examiner* — Kishor Mayekar
(74) *Attorney, Agent, or Firm* — Jackson IPG PLLC

(57) ABSTRACT

In a method for making a wave-absorbing sheet, first emulsified mixture is provided by mixing wave-absorbing particles with graphene solution so that the graphene solution absorbs the wave-absorbing particles. Secondly, second emulsified mixture is provided by adding and blending resin solution in the first emulsified mixture. Thirdly, third emulsified mixture is provided by adding and blending interface modifier in the second emulsified mixture. Then, two conductive substrates are submerged in the third emulsified mixture, and voltage is provided to the third emulsified mixture so that the wave-absorbing particles, the resin solution and the graphene solution are evenly coated on the conductive substrates. Then, a wave-absorbing sheet is provided by eroding and removing the conductive substrates. Finally, the wave-absorbing sheet is washed and dried. The wave-absorbing sheet is thin, light and flexible, and exhibits a wide absorption frequency band and a high absorption rate.

18 Claims, 6 Drawing Sheets

METHOD FOR MAKING A WAVE-ABSORBING SHEET

BACKGROUND OF INVENTION

1. Field of Invention

The present invention relates to a method for making a wave-absorbing sheet and, more particularly, to a method for making a thin, light, flexible wave-absorbing sheet that absorbs a wide band of frequency of electromagnetic wave at a high rate.

2. Related Prior Art

A microwave-absorbing material (or "wave-absorbing material") absorbs electromagnetic wave, transforms the electromagnetic energy into heat, and scatters the heat. Thus, the electromagnetic energy is attenuated.

In the military, wave-absorbing materials are used to conceal weapons from radars or protect radars from electromagnetic interference. In everyday life, wave-absorbing materials are used to protect 3C devices from electromagnetic interference that is getting worse as the frequencies of the pulses of CPUs are getting higher, and high-frequency mobile phones and vehicle-navigating devices are getting more popular.

The foregoing electronic devices produce electromagnetic wave that would interfere with other electronic devices and even hurt human bodies. Hence, there is a need for microwave-absorbing materials that fight undesirable electromagnetic wave (or "electromagnetic noise"). A wave-absorbing material is supposed to effectively absorb electromagnetic wave, transforms the electromagnetic energy into heat, and scatters the heat. Thus, the electromagnetic energy is attenuated. Wave-absorbing materials can be used in microwave anechoic rooms, electromagnetic compatibility, and protection from electromagnetic pollution.

Wave-absorbing materials are used for protecting mobile phones, laptop computers and other 3C from EMI. For example, when an RFID tag or reader/writer is attached to a metal surface, the distance for reading is much shorter than expected. Conventionally, the distance of the RFID antenna from the metal surface is increased to avoid the foregoing problem. The increased distance however renders the RFID tab or reader/writer thick.

Wave-absorbing materials are classified into a magnetic-loss type and an electric-loss type. Wave-absorbing materials are made of iron cores, ferrites, silver/nickel and iron/aluminum/silicon. The metal is grounded into powder and mixed with adhesive for use. The power includes solid particles. The problem with the use of metal is expensive and heavy.

The present invention is therefore intended to obviate or at least alleviate the problems encountered in prior art.

SUMMARY OF INVENTION

It is the primary objective of the present invention to provide a method for making a thin, light, flexible wave-absorbing sheet that absorbs a wide band of frequency of electromagnetic wave at a high rate.

To achieve the foregoing objective, the method includes the steps of providing first emulsified mixture by blending wave-absorbing particles in graphene solution so that the graphene solution is attached to the wave-absorbing particle, providing second emulsified mixture by mixing the first emulsified mixture with resin solution, providing third emulsified mixture by mixing the second emulsified mixture with interface modifier, providing the wave-absorbing particles, resin solution and graphene solution of the third emulsified mixture evenly on two conductive substrates by submerging the conductive substrates in the third emulsified mixture and imposing voltage on the conductive substrates, removing the conductive substrates to provide a wave-absorbing sheet, and washing and drying the wave-absorbing sheet.

In another aspect, the concentration of the wave-absorbing particles in the first emulsified mixture is 0.1% to 5%.

In another aspect, the graphene solution includes graphene dissolved in organic solvent. The concentration of the graphene in the grapheme solvent is 0.1% to 5%.

In another aspect, the organic solvent is methanol, ethanol, isopropyl alcohol or NMP.

In another aspect, each of the wave-absorbing particles includes a core placed in a shell.

In another aspect, the shell is made of metal and the core is made of plastics. The wave-absorbing particles are made by electroplating the metal on the plastics.

In another aspect, the wave-absorbing particles are made with a diameter of 100 nanometers to 50 micrometers. The wave-absorbing particles are spherical, elliptical or hollow spherical.

In another aspect, the core is made of acrylic resin solution, polystyrene, polymethylmethacrylate, poly-epoxy resin or silicon dioxide.

In another aspect, the shell is made of phosphorus ferronickel, NiMoFeP, iron phosphide or nickel phosphide. The shell takes 10 wt % to 80 wt % of each of the wave-absorbing particles.

In another aspect, the shell is made with thickness of 100 to 550 nanometers.

In another aspect, the step of providing the second emulsified mixture includes the step of stirring the second emulsified mixture for 5 minutes to 1 hour.

In another aspect, the step of providing the second emulsified mixture includes the step of providing resin solution as adhesive. The resin solution is acrylic resin solution and epoxy resin solution. The concentration of the resin solution in the second emulsified mixture is 0.1% to 5%.

In another aspect, the interface modifier is silver nitrate, magnesium nitrate, aluminum nitrate, barium nitrate or calcium nitrate. The concentration of the interface modifier is 100 to 400 gram/l.

In another aspect, the step of providing the third emulsified mixture evenly on the conductive substrates includes the step of connecting the conductive substrates to the positive and negative electrodes of a power supply.

In another aspect, the power supply provides operative voltage of 30 to 200 volts. The conductive substrates are made with an area of 1 cm² to 1 m². The electrophoresis lasts for 1 minute to 1 hour. The coating is made with thickness of 5 to 500 micrometers.

In another aspect, the conductive substrates are made of copper or aluminum.

In another aspect, the step of removing the conductive substrates includes the step of providing eroding liquid for eroding the conductive substrates for 1 to 24 hours. The concentration of the eroding liquid is higher than 20 vol. %.

In another aspect, the eroding liquid is copper-eroding liquid, iron chloride solution, aluminum-eroding liquid, sodium hydroxide solution or potassium hydroxide solution.

In another aspect, the step of washing and drying the wave-absorbing sheet includes the step of drying the wave-absorbing sheet at 50° C. to 200° C.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Referring to FIGS. 1 to 5, there is shown a method for making a thin, light, flexible wave-absorbing sheet that absorbs a wide band of frequency of electromagnetic wave at a high rate according to the preferred embodiment of the present invention.

Figure 1:
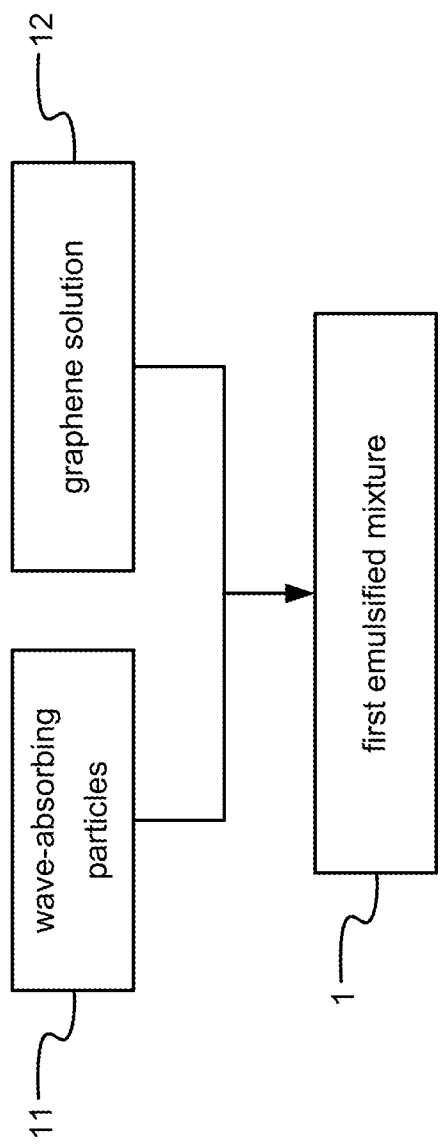
FIG. 1 shows a first step of a method for making a thin, light, flexible wave-absorbing sheet that absorbs a wide band of frequency of electromagnetic wave at a high rate according to the preferred embodiment of the present invention.

Referring to FIG. 1, at first, many wave-absorbing particles 11 are mixed with graphene solution 12 at a concentration of 0.1% to 5% so that the graphene solution 12 is attached to the wave-absorbing particles 11, thus providing first emulsified mixture 1. The graphene solution 12 is made by dissolving grapheme in organic solvent at a concentration of 0.1% to 5%. The organic solvent may be methanol, alcohol, isopropyl alcohol or NMP.

Figure 2:
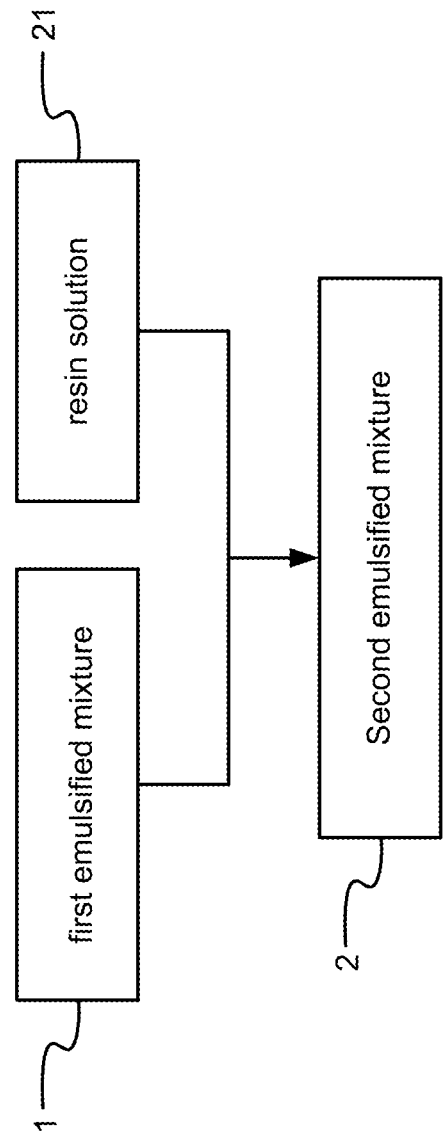
FIG. 2 shows a second step of the method according to the preferred embodiment of the present invention.

Referring to FIG. 2, the first emulsified mixture 1 is blended into the resin solution 21, thus providing second emulsified mixture 2. The stirring lasts for 5 minutes to 1 hour. The resin solution 21 is used as adhesive. The resin solution 21 may be acrylic resin solution or epoxy resin solution. The concentration of the resin solution 21 in the second emulsified mixture 2 is 0.1% to 5%.

Figure 3:
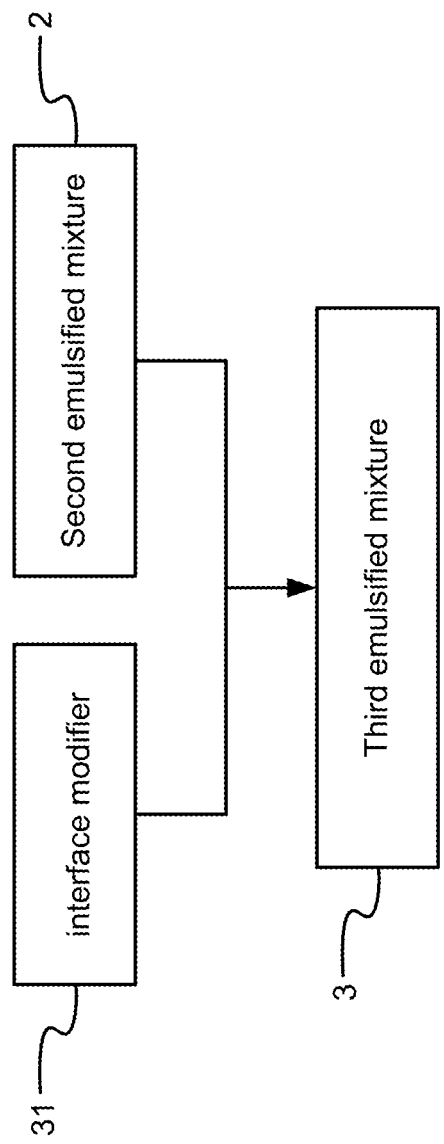
FIG. 3 shows a third step of the method according to the preferred embodiment of the present invention.

Referring to FIG. 3, interface modifier 31 is blended in the second emulsified mixture 2, thus providing third emulsified mixture 3. The interface modifier 31 may be solution of silver nitrate, magnesium nitrate, aluminum nitrate, barium nitrate and/or calcium nitrate. The concentration of the interface modifier 31 is 100 to 400 g/l.

Figure 4:
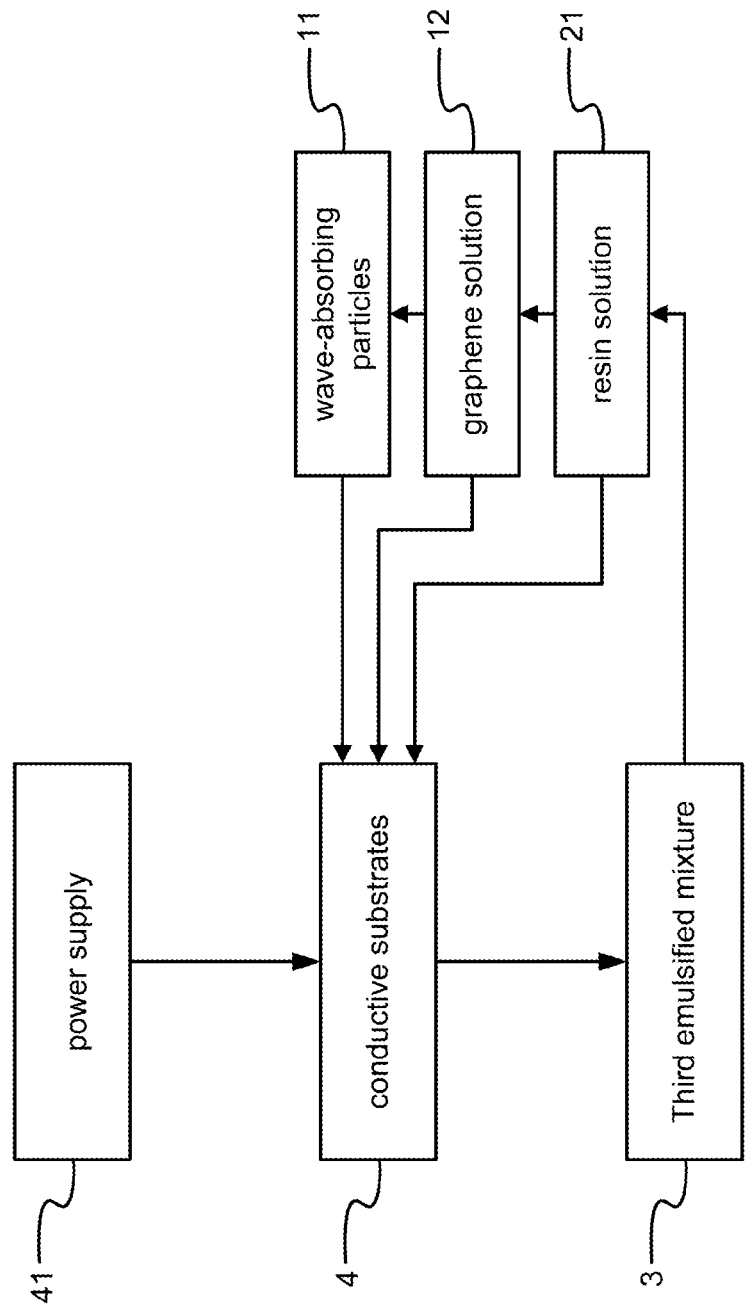
FIG. 4 shows a fourth step of the method according to the preferred embodiment of the present invention.

Referring to FIG. 4, two conductive substrates 4 are submerged in the third emulsified mixture 3. The conductive substrates 4 are connected to positive and negative electrodes of a power supply 41, respectively. The conductive substrates 4 may be made of copper or aluminum. The power supply 41 is used to evenly provide the wave-absorbing particles 11, the resin solution 21 and graphene solution 12 in the third emulsified mixture 3 on the conductive substrates 4. The operative voltage of the power supply 41 is 30 to 200 volts. The area of the conductive substrates 4 is 1 cm$^2$ to 1 m$^2$. The electrophoresis lasts for 1 minute to 1 hour. The thickness of the coating is 5 to 500 micrometers.

Figure 5:
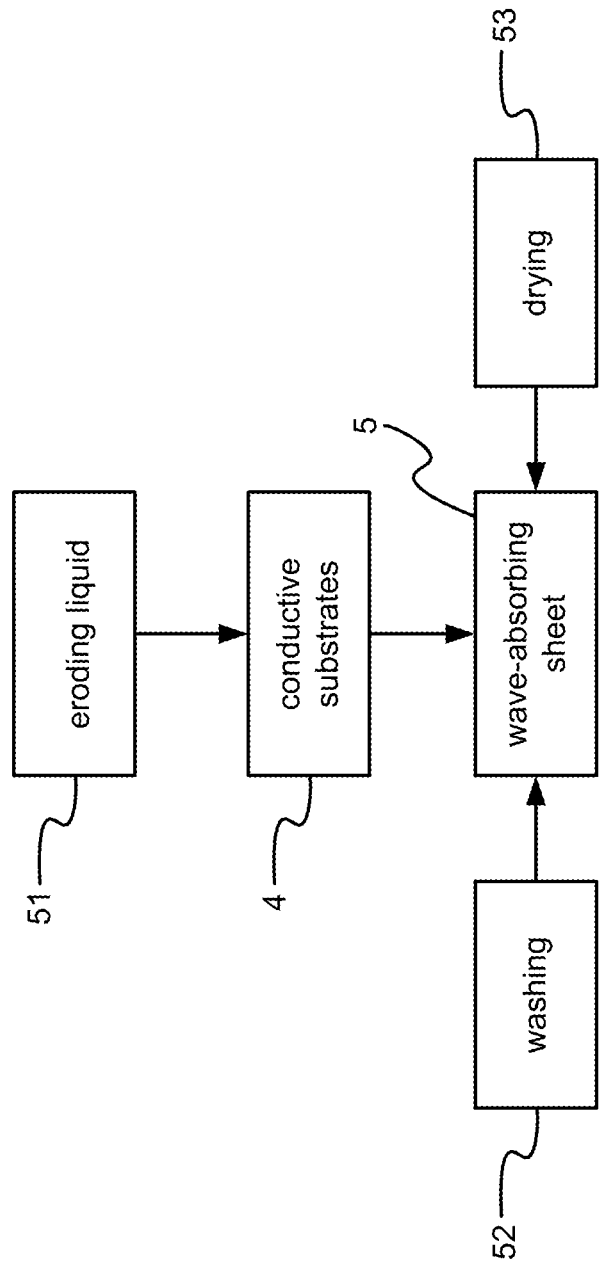
FIG. 5 shows a fifth step of the method according to the preferred embodiment of the present invention.

Referring to FIG. 5, eroding liquid 51 is used to erode and remove the conductive substrates 4, thus leaving a wave-absorbing sheet 5. The erosion lasts for 1 to 24 hours. The concentration of the eroding liquid 51 is higher than 20 vol. %. Then, wave-absorbing sheet 5 is subject to washing 52 and drying 53. The eroding liquid 51 may be copper-eroding liquid, iron chloride solution, aluminum-eroding liquid, sodium hydroxide solution or potassium hydroxide solution. The drying 53 is executed at 50° C. to 200° C.

Figure 6:
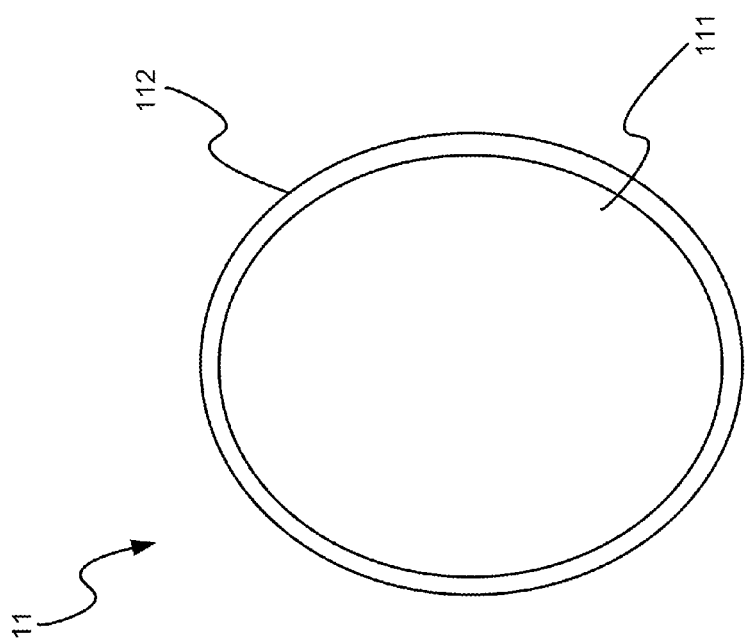
FIG. 6 is a cross-sectional view of a wave-absorbing particle made in the method according to the preferred embodiment of the present invention.

Referring to FIG. 6, each of the wave-absorbing particles 11 is made with a core-shell structure that includes a core 111 and a shell 112. The core 111 is made of plastics and the shell 12 is made of metal. The wave-absorbing particles 11 are made by electroplating the metal on the plastics. The diameter of the wave-absorbing particles 11 is 100 nanometers to 50 micrometers. The wave-absorbing particles 11 are spherical, elliptical or hollow spherical. The core 111 is made of acrylic resin, polystyrene, poly-methylmethacrylate, poly-epoxy resin or silicon dioxide. The shell 112 is made of phosphorus ferronickel, NiMoFeP, iron phosphide or nickel phosphide. The weight percentage of the shell 112 in each of the wave-absorbing particles 11 is 10 wt % to 80 wt %. The thickness of the shell 112 is 100 to 550 nanometers.

The wave-absorbing sheet 5 is made of the wave-absorbing particles 11 and graphene solution 12 so that it is light. The core-shell structure, which consists of the core 111 and the shell 112, enables the wave-absorbing particles 11 to absorb microwave better than conventional wave-absorbing materials. Hence, wave-absorbing sheet 5 exhibits excellent thermal stability and mechanical properties, is light, inexpensive and flexible, and absorbs well.

The wave-absorbing sheet 5 may be used in LF (125 to 134.2 KHz) or HF (13.56 MHz) for example. The wave-absorbing sheet 5 may be attached to an RFID antenna before it is attached to a metal surface. The distance for reading can be as high as 80% of the distance for reading when the RFID antenna is not attached to the metal surface. The wave-absorbing sheet 5 is thin, so that an RFID tag or reader/writer that includes the wave-absorbing sheet 5 is thin. When wave-absorbing materials are made with identical thickness, those with higher magnetic permeability allow more magnetic flux, impose less influence on metal, and allow longer distance for reading. This is why magnetic materials must be added into wave-absorbing materials. The wave-absorbing sheet 5 is better than any other wave-absorbing sheets on the market, and can be used to protect mobile phones, laptop computers, other 3C products, and RFID devices (tag/NFC) against EMI.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for making a wave-absorbing sheet including the steps of:
   providing first emulsified mixture by blending wave-absorbing particles in graphene solution so that the graphene solution is attached to the wave-absorbing particles;
   providing second emulsified mixture by mixing the first emulsified mixture with resin solution;
   providing third emulsified mixture by mixing the second emulsified mixture with interface modifier;
   providing by electrophoresis a coating of the wave-absorbing particles, resin solution and graphene solution of the third emulsified mixture evenly on two conductive substrates by submerging the conductive substrates in the third emulsified mixture and imposing voltage on the conductive substrates;
   removing coated the conductive substrates, thus providing a wave-absorbing sheet; and
   washing and drying the wave-absorbing sheet.

2. The method for making a wave-absorbing sheet according to claim 1, wherein the graphene solution includes graphene dissolved in organic solvent.

3. The method for making a wave-absorbing sheet according to claim 2, wherein the organic solvent is selected from the group consisting of methanol, ethanol, isopropyl alcohol and NMP.

4. The method for making a wave-absorbing sheet according to claim 1, wherein each of the wave-absorbing particles includes a shell and a core placed in the shell.

5. The method for making a wave-absorbing sheet according to claim 4, wherein the shell is made of metal and the core is made of plastics, wherein the wave-absorbing particles are made by electroplating the metal on the plastics.

6. The method for making a wave-absorbing sheet according to claim 5, wherein the wave-absorbing particles are made with a diameter of 100 nanometers to 50 micrometers, wherein the wave-absorbing particles are made with a shape selected from the group consisting of spherical, elliptical and hollow spherical.

7. The method for making a wave-absorbing sheet according to claim 5, wherein the core is made of a material selected from the group consisting of acrylic resin solution, polystyrene, polymethylmethacrylate, poly-epoxy resin and silicon dioxide.

8. The method for making a wave-absorbing sheet according to claim 5, wherein the shell is made of a material selected from the group consisting of phosphorus ferronickel, NiMoFeP, iron phosphide and nickel phosphide, wherein the shell takes 10 wt % to 80 wt % of each of the wave-absorbing particles.

9. The method for making a wave-absorbing sheet according to claim 5, wherein the shell is made with thickness of 100 to 550 nanometers.

10. The method for making a wave-absorbing sheet according to claim 1, wherein the step of providing the second emulsified mixture includes the step of stirring it for 5 minutes to 1 hour.

11. The method for making a wave-absorbing sheet according to claim 1, wherein the step of providing the second emulsified mixture includes the step of providing the resin solution as adhesive, wherein the resin solution is selected form the group consisting of acrylic resin solution and epoxy resin solution.

12. The method for making a wave-absorbing sheet according to claim 1, wherein the interface modifier is selected from the group consisting of silver nitrate, magnesium nitrate, aluminum nitrate, barium nitrate and calcium nitrate.

13. The method for making a wave-absorbing sheet according to claim 1, wherein the step of providing a coating the third emulsified mixture evenly on the conductive substrates includes the step of connecting the conductive substrates to the positive and negative electrodes of a power supply.

14. The method for making a wave-absorbing sheet according to claim 13, wherein the power supply provides operative voltage of 30 to 200 volts, wherein the conductive substrates are made with an area of 1 $cm^2$ to 1 $m^2$, wherein the electrophoresis lasts for 1 minute to 1 hour, wherein the coating is made with thickness of 5 to 500 micrometers.

15. The method for making a wave-absorbing sheet according to claim 1, wherein the conductive substrates are made of a material selected from the group consisting of copper and aluminum.

16. The method for making a wave-absorbing sheet according to claim 1, wherein the step of removing the conductive substrates includes the step of providing eroding liquid for eroding the conductive substrates for 1 to 24.

17. The method for making a wave-absorbing sheet according to claim 16, wherein the eroding liquid is selected from copper-eroding liquid, iron chloride solution, aluminum-eroding liquid, sodium hydroxide solution and potassium hydroxide solution.

18. The method for making a wave-absorbing sheet according to claim 1, wherein the step of washing and drying the wave-absorbing sheet includes the step of drying the wave-absorbing sheet at 50° C. to 200° C.

\* \* \* \* \*